(12) United States Patent
Kurichiyath et al.

(10) Patent No.: US 10,706,012 B2
(45) Date of Patent: Jul. 7, 2020

(54) FILE CREATION

(71) Applicant: HEWLETT PACKARD ENTERPRISE DEVELOPMENT LP, Houston, TX (US)

(72) Inventors: Sudheer Kurichiyath, Bangalore (IN); Neducheralathan Shanmugam, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 561 days.

(21) Appl. No.: 15/327,437

(22) PCT Filed: Nov. 18, 2014

(86) PCT No.: PCT/US2014/066233
§ 371 (c)(1),
(2) Date: Jan. 19, 2017

(87) PCT Pub. No.: WO2016/018447
PCT Pub. Date: Feb. 4, 2016

(65) Prior Publication Data
US 2017/0147571 A1  May 25, 2017

(30) Foreign Application Priority Data
Jul. 31, 2014 (IN) .......................... 3765/CHE/2014

(51) Int. Cl.
*G06F 17/30* (2006.01)
*G06F 16/16* (2019.01)

(52) U.S. Cl.
CPC ............ *G06F 16/164* (2019.01); *G06F 16/16* (2019.01)

(58) Field of Classification Search
USPC ................................................ 707/825, 823
See application file for complete search history.

(56) References Cited

U.S. PATENT DOCUMENTS

| 7,433,928 | B1 | 10/2008 | Rartade et al. | |
| 7,809,779 | B2* | 10/2010 | Ahn | G06F 16/13 707/828 |
| 7,890,529 | B1* | 2/2011 | Srinivasan | G06F 17/30094 707/781 |
| 8,972,466 | B1* | 3/2015 | Kumar | G06F 17/30091 707/823 |

(Continued)

FOREIGN PATENT DOCUMENTS

| CN | 102184213 A | 9/2011 |
| WO | WO-2006121526 A2 | 11/2006 |

OTHER PUBLICATIONS

Mitasch, Christoph, EXT4 Filesystem, published Aug. 29, 2013 (Year: 2013).*

(Continued)

*Primary Examiner* — Jeff A Burke
(74) *Attorney, Agent, or Firm* — Hewlett Packard Enterprise Patent Department

(57) ABSTRACT

The present subject matter relates to file creation. In one example a user request for creating a new file is received. An inode corresponding to a pre-created file is retrieved from a pre-created pool of files in response to receiving the user request. Further, the inode is associated with an in-memory dentry corresponding to the new file. Further, a log entry is created in an intent log to indicate intent of lazy linking of the pre-created file with a target directory in which the new file is to be created. Further, lazy linking of the pre-created file with the target directory is performed using a file system link operation upon occurrence of a predefined event.

15 Claims, 6 Drawing Sheets

(56) References Cited

U.S. PATENT DOCUMENTS

| | | | |
|---|---|---|---|
| 2003/0131020 A1* | 7/2003 | Karamanolis | G06F 17/30067 |
| 2007/0168678 A1* | 7/2007 | Meenakshisundaram | |
| | | | G06F 12/1483 |
| | | | 713/189 |
| 2009/0182836 A1* | 7/2009 | Aviles | H04L 41/0893 |
| | | | 709/213 |
| 2009/0271412 A1* | 10/2009 | Lacapra | G06F 17/30206 |
| 2010/0030739 A1 | 2/2010 | Lanjewar et al. | |
| 2010/0057755 A1* | 3/2010 | Schneider | G06F 16/10 |
| | | | 707/E17.01 |
| 2011/0022653 A1* | 1/2011 | Werth | H04L 67/34 |
| | | | 709/202 |
| 2012/0036161 A1* | 2/2012 | Lacapra | G06F 17/30194 |
| | | | 707/781 |
| 2013/0046802 A1 | 2/2013 | Nemoto et al. | |
| 2013/0262758 A1 | 10/2013 | Smith et al. | |
| 2014/0310473 A1* | 10/2014 | Bilas | G06F 11/00 |
| | | | 711/129 |

OTHER PUBLICATIONS

Wu et al., "A file system for Storage Class Memory", 2011 International Conference for High Performance Computing, Networking, Storage and Analysis, 2011, 2 pages.

Khan, S., "NFSv4.1: Directory Delegations and Notifications", Network Working Group, Network Appliance, Inc., Mar. 2005, 24 pages.

International Preliminary Report on Patentability received for PCT Patent Application No. PCT/US2014/066233, dated Feb. 9, 2017, 7 pages.

Carns et al., "Small-file access in parallel file systems", 2009 IEEE International Symposium on Parallel & Distributed Processing, 2009, 11 pages.

Brandt, S. A. et al., "Efficient Metadata Management in Large Distributed Storage Systems," (Research Paper), Apr. 7-10, 2003, pp. 290-298, available at ftp://ftp.soe.ucsc.edu/pub/darrell/MSST-Brandt-03.pdf.

Devulapalli, A. et al., "File Creation Strategies in a Distributed Metadata File System," (Research Paper), Aug. 26-30, 2007, 10 pages, available at http://ieeexplore.ieee.org/stamp/stamp.jsp?arnumber=4228023.

Garrett, W. E. et al., "Linking Shared Segments," (Research Paper), Jan. 1993, pp. 13-28, available at http://www.cs.rochester.edu/~scott/papers/1993_USENIX_Hemlock.pdf.

International Search Report & Written Opinion received in PCT Application No. PCT/US2014/066233, dated Mar. 30, 2015, 10 pages.

Volos, H. et al., "Aerie: Flexible File-system Interfaces to Storage-class Memory," (Research Paper), Apr. 13-16, 2014, 14 pages, available at http://wisdom.cs.wisc.edu/publications/2014/5.pdf.

* cited by examiner

FILE CREATION

BACKGROUND

Increasing use of data generation and processing in enterprises produces ever-increasing amounts of information which are stored for short, medium, or long periods. The information is generally stored for re-use by the organization. To maintain such information, enterprises generally implement data management techniques and file systems. Generally, storing the information using a file system involves creating a file, adding information in the file, deleting/archiving the file, and setting permissions for the file.

BRIEF DESCRIPTION OF FIGURES

The detailed description is described with reference to the accompanying figures. In the figures, the left-most digit(s) of a reference number identifies the figure in which the reference number first appears. The same numbers are used throughout the figures to reference like features and components. Systems and/or methods, in accordance with examples of the present subject matter are now described, by way of example, and with reference to the accompanying figures, in which.

DETAILED DESCRIPTION

Figure 1A:
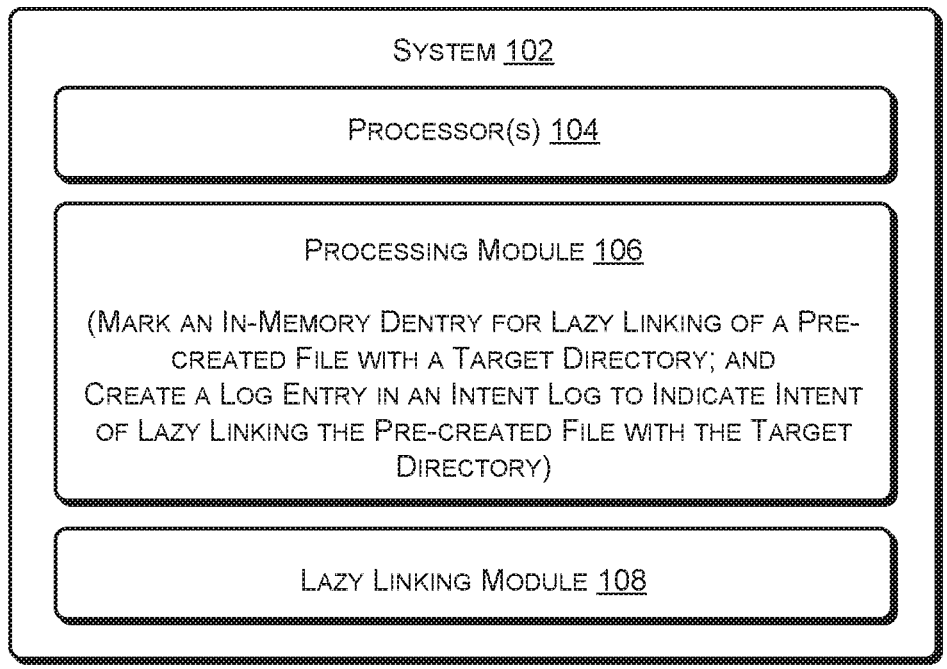
FIG. 1(a) illustrates a block diagram of an example system for file creation, in accordance with an example of the present subject matter.

Systems and methods for file creation are described herein. The methods can be implemented in various systems, such as computing devices connected through various networks. Although the description herein is with reference to systems used for file creation, the methods and described techniques may be implemented in other systems, albeit with a few variations.

A file system may be understood as an abstraction implemented onto disk storage for organizing and storing data. The file system may also facilitate in controlling the manner in which the data is stored and retrieved from the storage disk. A storage device, such as a disk includes many data storage units known as "blocks". When a file is stored in the storage device, the file data is written and stored over multiple blocks. Therefore, each file is usually considered to be associated with a list of blocks storing the file data. The list of the blocks associated with the file is maintained and stored in an index node (referred to as an inode) associated with the file. The inode includes metadata associated with the file. The metadata may include, inode number, attributes, number of blocks, file size, file type, block map information, and the like. The inode, however, does not store the file data and the file name of the file.

A file creation process is generally initiated when a new file has to be created for storing data on the storage device or on a network device. The file creation process is generally considered to be a high latency process involving various steps to be performed in a predefined sequence. The various steps include, but are not limited to, inode allocation, adding dentry, and adding initial blocks in case the file requires a pre-allocated storage. Further, certain file systems, such as Avatar file systems may involve additional steps like allocating tag or inode number. The latency associated with the file creation process may be further exacerbated for certain file system protocols, such as network file system (NFS). In such a case, owing to strict protocol compliance, the NFS requires a synchronous file creation which involves multiple non sequential synchronous block commits.

Latency is further observed in cases of multi-tiered non-volatile memory (NVM) integrated file server stacks if the file is created at a storage device latency rather than a NVM latency. In such a case, the file creation latency increases as the storage device operates at a higher read/write latency as compared to the NVM. This may happen as the NVM is a first tier storage in such file server stacks and the storage disk based file system is at a tier subsequent to the NVM. A pre-created pool of files that includes pre-allocated inodes and blocks may be used in order to reduce the latency associated with the file creation process. Using such a pre-created pool of files reduces initial time involved in inode and block allocation. However, linking the inode with a target namespace to create the new file involves considerable latency.

System and a method for file creation are described. The system and the method facilitate in implementing a file creation process with low or minimal latency. The present subject matter involves using a pre-created pool of files and lazy linking of the pre-created files to a target namespace, i.e., a namespace in which a new file is to be created. As discussed in the following sections, using lazy linking of pre-created files to a target namespace facilitates in deferring the high latency step of linking the pre-created files and the target namespace, thus enabling fast file creation.

In accordance to an example of the present subject matter, initially a pre-created pool of files is created. The pre-created pool of files includes a plurality of pre-created files and corresponding inodes. The pre-created files may be defined, in one example, as physical blocks linked to corresponding inodes. The pre-created files are, however, not assigned any filenames and are added to a hidden namespace of the pre-created pool of files for being used later for file creation.

In one example, a user intending to store data in a storage device of the system may provide a user request for creating a new file for storing the data. Upon receiving the user request for creating the new file, an inode corresponding to a pre-created file from the pre-created pool of files is retrieved. In one example, the inode is moved from the pre-created pool of files to a lazy_link list for creating the new file. The lazy_link list includes a list of plurality of inodes being currently used for file creation using a method of lazy linking. The lazy_link list further includes a list of dentries corresponding to each of the plurality of inodes.

The inode is subsequently associated with an in-memory dentry, from the dentries listed in the lazy_link list, corresponding to the new file that has to be created. The in-memory dentry may be considered as directory entry created in a transient memory, such as a random access memory (RAM). The dentry is further marked using a predefined flag to indicate that the dentry requires a lazy link commit for lazy linking the pre-created file with a target directory in the target namespace. The target directory is a directory in which the new file is to be created. In one example, associating the inode with the in-memory dentry includes associating the inode with a filename of the new file.

Subsequently, a log entry corresponding to the new file is created in an intent log in an NVM of the system. The log entry indicates the intent of lazy linking the pre-created file with a target directory. In one example, lazy linking of the pre-created files may be considered as a process in which linking of the pre-created file and the target directory is deferred till the occurrence of a predefined event. In one example, lazy linking of the pre-created files may be considered as a process in which linking of the pre-created file and the target directory is deferred till the occurrence of the predefined event. The predefined event, in one example, may be termination of a last reference of the dentry, during the process of new file creation. The predefined event, in another example, may be a post-crash recovery process performed subsequent to abrupt shutdown or system-crash of the system. The predefined event, in another example, may be a rename operation performed in response to receiving a rename request for renaming a file before the lazy link is committed. The predefined event, in yet another example, may be an overflow of the intent log. In said example, the lazy linking may be performed proactively upon determining overflow of the intent log.

The system may thus defer the linking till occurrence of the predefined event. Upon occurrence of the predefined event, a file system link operation may be performed to link the pre-created file with the target directory.

Lazy linking the pre-created file with the target directory facilitates in decreasing the latency associated with file creation as the new file is created and made available for access to the user after the creation of the intent log without waiting for actual linking of the pre-created file with the target directory process. The subject matter thus facilitates in file creation with low latency.

Further, in order to ensure that an inode is not used for creation of more than one files, a lazy unlink of inodes is performed. In one example, the lazy_link list is initially analyzed to identify one or more inodes having a link count of greater than one. The link count indicates a number of dentries with which an inode is associated. The inodes having the link count of greater than one are then removed from the pre-created pool to avoid further linking of the inodes. In one example, the lazy unlinking may also be performed during a post-crash recovery of the system to move the inodes having the link count of greater than one from the pre-created pool of files to the lazy_link list.

The present subject matter thus facilitates in fast creation of files using a method of lazy linking. Lazy linking the pre-created file with the target directory facilitates in decreasing the latency associated with file creation as the file is created at latency rate associated with the NVM instead of the latency rate of the storage device based file system. As previously described, the latency rate associated with the NVM is lesser as compared to the latency rate of the storage device based file system. Thus, creating the in-memory dentry and associating the inode with the in-memory dentry facilitates in file creation at a lower latency than other systems having variable latencies. Further, creating the log entry in the intent log to indicate the intent of lazy linking facilitates in achieving crash consistency. In case of any abrupt system shut down or system-crash the intent log may be used to identify the pre-created files that have to be lazy linked.

Further, performing a proactive and early lazy linking facilitates in handling intent log space exhaustion as performing the early lazy linking reduces the number of logs created in the intent log, thus maintaining memory space in the NVM of the system. Performing such a proactive and early lazy linking further facilitates in reducing recovery time associated with the file creation. The recovery time, in one example, is defined as a function of the number of unhandled lazy link entries in the intent log. Thus, reducing the number of lazy link entries, by performing the proactive linking, reduces the associated recovery time. Additionally, implementing the lazy unlink helps in avoiding multiple linking of a single inode. Lazy unlink further facilitates in an accurate creation of lazy_link list in cases of abrupt system shut down or system-crash as the lazy unlink may be performed as a part of post-crash recovery to move the already used inodes to the lazy_link list from the pre-created pool of files.

The above systems and methods are further described in conjunction with FIG. 1 to FIG. 5. It should be noted that the description and figures merely illustrate the principles of the present subject matter. It will thus be appreciated that various arrangements that embody the principles of the present subject matter, although not explicitly described or shown herein, can be devised from the description and are included within its scope. Furthermore, all examples recited herein are for pedagogical purposes to aid the reader in understanding the principles of the present subject matter. Moreover, all statements herein reciting principles, aspects, and examples of the present subject matter, as well as specific examples thereof, are intended to encompass equivalents thereof.

FIG. 1($a$) illustrates a block diagram of an example system 102 for file creation, in accordance with an example of the present subject matter. The system 102 may be implemented in, for example, desktop computers, multiprocessor systems, personal digital assistants (PDAs), laptops, network computers, cloud servers, minicomputers, mainframe computers, hand-held devices, such as tablets. The system 102 may also be hosting a plurality of applications.

The system 102 may include, for example, processor(s) 104, a processing module 106 communicatively coupled to the processor 104, and a lazy linking module 108 communicatively coupled to the processor 104.

The processor(s) 104 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

In operation, upon receiving a user request from a user for creating a new file, the processing module 106 may retrieve an inode corresponding to a pre-created file from a pre-created pool of files in response to the user request. In one example, the pre-created files may be defined as physical blocks linked to corresponding inodes. The pre-created files are, however, not assigned any filenames and are added to a hidden namespace of the pre-created pool of files. As a result, such pre-created files are not available to the users. The processing module 106 may subsequently associate the inode with an in-memory dentry corresponding to the new file. The in-memory dentry is defined as a directory entry created in a volatile storage, such as a random access memory (RAM).

The processing module 106 may further mark the in-memory dentry for lazy linking of the pre-created file with a target directory. The target directory is a directory in which the new file is to be created. The processing module 106 may then create a log entry in an intent log to indicate intent of lazy linking the pre-created file with the target directory. In one example, the processing module 106 may create the intent log in a non-volatile memory (NVM) of the system 102. Creating the log entry in the intent log facilitates in achieving crash consistency as the intent log may be used to identify the pre-created files that have to be lazy linked in case of any abrupt system shut down or system-crash. In one example, linking of the pre-created file and the target directory is deferred till the occurrence of a predefined event.

Subsequently, the lazy linking module 108 initiates a file system link operation for linking the pre-created file with the target directory. As a result of the linking, the new file is created. In one implementation, the lazy linking module 108 may initiate the lazy linking upon receiving a notification indicating occurrence of the predefined event.

Figure 1B:
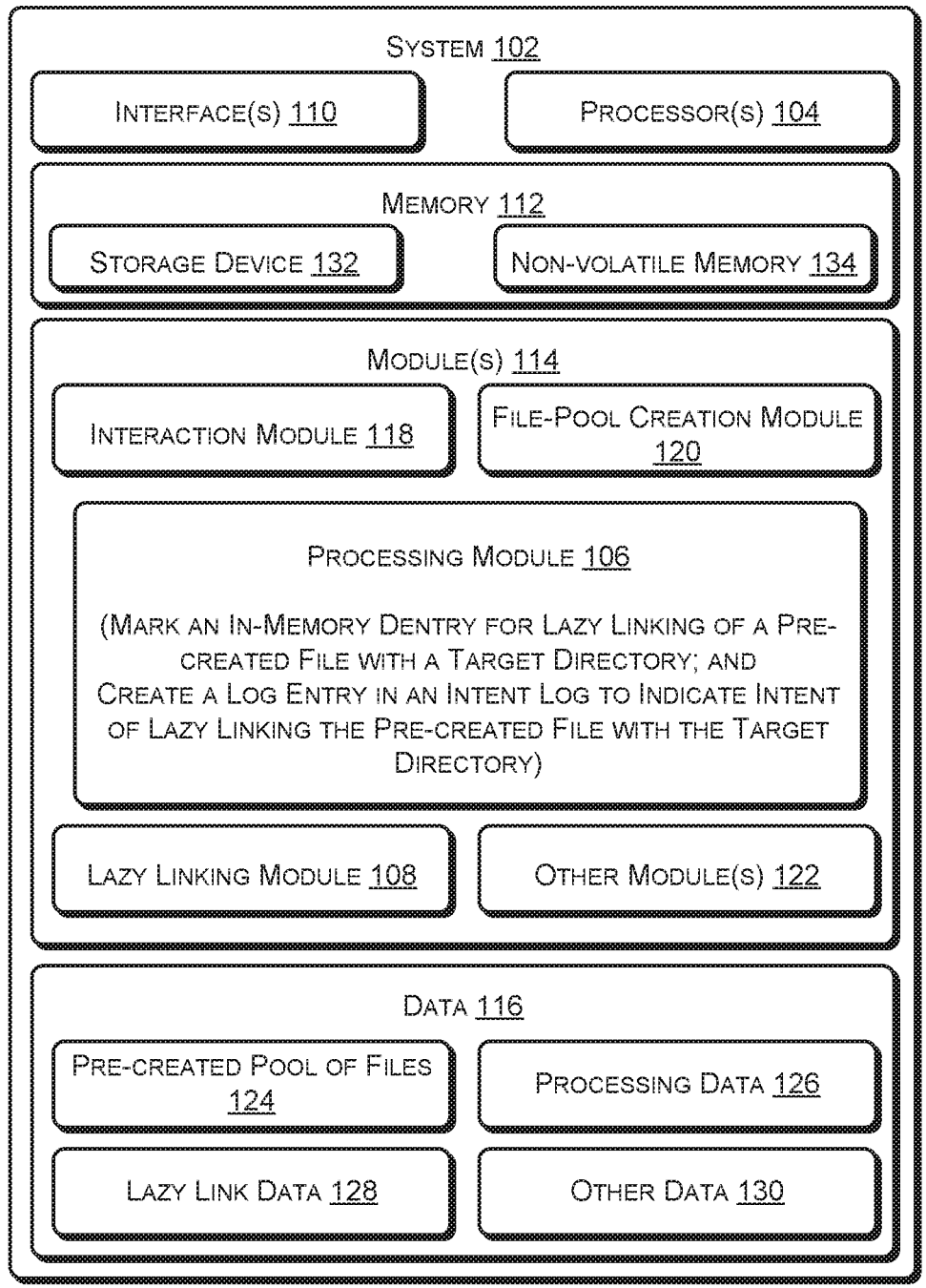
FIG. 1(b) illustrates various example components of the example system for file creation, in accordance with an example of the present subject matter.

FIG. 1(b) illustrates various components of the system 102, in accordance with an example of the present subject matter. The system 102 includes the processor(s) 104, interface(s) 110, memory 112, modules 114, and data 116. The interfaces 110 may include a variety of commercially available interfaces, for example, interfaces for peripheral device(s), such as data input output devices, referred to as I/O devices, interface cards, storage devices, and network devices.

The modules 114, amongst other things, include routines, programs, objects, components, and data structures, which perform particular tasks or implement particular abstract data types. The modules 114 may also be implemented as, signal processor(s), state machine(s), logic circuitries, and/or any other device or component that manipulate signals based on operational instructions. Further, the modules 114 can be implemented by hardware, by computer-readable instructions executed by a processing unit, or by a combination thereof.

The modules 114 may include an interaction module 118, a file-pool creation module 120, the processing module 106, the lazy linking module 108, and other module(s) 122. The other modules 122 may include programs or coded instructions that supplement applications and functions, for example, programs in an operating system of the system 102. Further, the data 116 may include pre-created pool of files 124, processing data 126, lazy link data 128, and other data 130.

The memory 112 may be communicatively coupled to the processor 104 and may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one example, the memory 112 may include a storage device 132 and a non-volatile memory (NVM) 134. The storage device, such as hard disks and magnetic tapes may be used for storing content, such as files in the system. The NVM 134, such as a flash memory (not shown in the figure) may be used for intermediate storage of data that is to be accessed at low latency. The memory may further include a main memory (not shown in the figure) for temporary storage of content for processing by the system 102.

As previously described, the system 102 facilitates in low latency file creation using a pre-created pool of files and lazy linking of the pre-created files to a target namespace. The target namespace is a namespace in which a new file is to be created. In one example, the file-pool creation module 120 facilitates in creating and regularly populating the pre-created pool of files, for example, the pre-created pool of files 124. The pre-created pool of files 124 includes a plurality of pre-created files and corresponding inodes. The pre-created files may include either new pre-created files or old deleted files that have been deleted from the storage device 132 of the system 102.

In one example, upon obtaining a pre-created file for being added to the pre-created pool of files, the file-pool creation module 120 may further determine whether the pre-created file is a deleted file or a new pre-created file. In case the pre-created file is a new pre-created file, the file-pool creation module 120 may add the pre-created file to a hidden name space of the pre-created pool of files. On determining the pre-created file to be an old deleted file, the file-pool creation module 120 may confirm using, for example, system logs that whether the pre-created file has been completely deleted or not. In case the pre-created file is confirmed to have been completely deleted, the file-pool creation module 120 may add the pre-created file to the hidden name space of the pre-created pool of files. In case the pre-created file hasn't been completely deleted, the file-pool creation module 120 may wait for the pre-created file to be deleted before adding the pre-created file to the pre-created pool of files. Once populated, the pre-created pool of files are used for fast creation of new files in response to a user request received from a user device (not shown in the figure) of the user.

In one example, the user request is received by the interaction module 118. Upon receiving the request, the interaction module 118 may analyze the user request to determine a purpose of the user request. Upon determining the user request to be a request for creating a new file, the interaction module 118 may provide the user request to the processing module 106 for creating the new file.

The processing module 106, upon receiving the user request for the new file creation may retrieve an inode corresponding to a pre-created file from the pre-created pool of files. In one example, the processing module 106 may issue a predefined command, say, a Get_Inode_From_Pool command for retrieving the inode from the pre-created pool of files. It should be noted that the present command is provided for purposes of illustration, and should not be construed as limiting the scope of the present subject matter.

The processing module 106 may further access the pre-created pool of files to retrieve the inode and the pre-created file. In case the pre-created pool of files is empty, the processing module 106 may abort the current file creation process and initiate with a normal non-accelerated file creation process. The processing module 106 may further inform the file-pool creation module 120 to populate the pre-created pool of files 124.

In case the pre-created pool of files includes the inode and the pre-created file, the processing module 106 may obtain the inode for further processing. In one example, the processing module 106 may determine the inode and the pre-created file that have to be obtained based on predetermined parameters, such user ID, group ID, ACL, and extended attributes corresponding to the new file that has to be created. The processing module 106 may access a free_list of inodes to determine one or more inodes corresponding to the attributes associated with the new file. The processing module 106 may identify and obtain the inode and the pre-created file that matches with the predetermined parameters corresponding to the new file.

Once the pre-created file and the associated inode are obtained, the processing module 106 may associate the inode with an in-memory dentry corresponding to the new file. The in-memory dentry may be defined as directory entry created in a transient memory within the memory 112, such as a random access memory (RAM). The in-memory dentry corresponds to the new file that has to be created and includes a filename of the new file. In one example, the processing module 106 may link the inode with the filename of the new file for creating the new file. Further, in one example, the processing module 106 may create the in-memory dentry corresponding to the new file before associating the inode with the in-memory dentry. In one example, the processing module 106 may move the inode from the free_list of inodes in the pre-created pool of files to a lazy_link list in the processing data 126. The lazy_link list includes a list of plurality of inodes that have been or are currently being used for fast file creation. The lazy_link list further includes a list of dentries corresponding to the plurality of inodes. In one example, the free_list of inodes and the lazy_link list may be saved in the transient memory, such as the RAM of the system 102.

The processing module 106, on associating the inode with an in-memory dentry, may subsequently mark the in-memory dentry for lazy linking to indicate that the dentry requires a lazy link commit for lazy linking the pre-created file with the target directory in the target namespace. In one example, the processing module 106 may mark the in-memory dentry using a predefined flag. The predefined flag may be, for example, dcache_op_lazylink.

Upon marking the dentry, the processing module 106 may create a log entry in an intent log to indicate intent of lazy linking the pre-created file with the target directory. The intent log is saved in the NVM 134 associated with the system 102. In one example, the log entry may include one or parameters, such as a parent inode number, the filename of the new file, inode number of the inode number being used for the file creation, and a flag lazy_link. The flag lazy_link facilitates in indicating that log entry relates to a lazy link operation. The parent inode number corresponds to the parent directory in which the target directory is located. As previously described, creating the log entry in the intent log facilitates in achieving crash consistency during the process of file creation. In one example, upon creation of the log entry in the intent log, the new file is deemed to be created and made available for immediate user access and the step of linking the pre-created file and the target directory is deferred.

In one example, linking of the pre-created file and the target directory is performed using a process of lazy linking. In one example, lazy linking of the pre-created files may be considered as a process in which linking of the pre-created file and the target directory is deferred till the occurrence of the predefined event. The predefined event, in one example, may be termination of a last reference of the dentry, during the process of new file creation. The predefined event, in another example, may be a post-crash recovery process performed subsequent to abrupt shutdown or system-crash of the system 102. The predefined event, in another example, may be a rename operation performed in response to receiving a rename request for renaming a file before the lazy link is committed. The predefined event, in yet another example, may be an overflow of the intent log. In said example, the lazy linking may be performed proactively upon determining overflow of the intent log. The processing module 106 in said example may send an early linking request to the lazy linking module 108, requesting the lazy linking module 108 to perform the lazy linking even before the last reference of the dentry is terminated. Performing such a proactive and early lazy linking facilitates in handling intent log space exhaustion as deferring the linking process for a high number of file creation processes concurrently may increase the number of logs created in the intent log, thus affecting memory space in the NVM 134. Performing such a proactive and early lazy linking further facilitates in reducing recovery time associated with the file creation. The recovery time, in one example, is defined as a function of the number of unhandled lazy link entries in the intent log. Thus, reducing the number of lazy link entries, by performing the proactive linking, reduces the associated recovery time.

In case, where no proactive linking is to be performed, the linking may be deferred till the last reference of the dentry is terminated. As previously described, last reference of dentry indicates last instance of dentry access. Upon termination of the last reference, the processing module 106 may generate a release notification indicating termination of the last reference. The processing module 106 may subsequently provide the release notification to the lazy linking module 108.

In one example, the lazy linking module 108 receives the release notification as an operation code notification and saves the same in the lazy link data 128. The operation code notification may be, in an example, a release notification indicating termination of the last reference of dentry. The operation code notification may be, in another example, a delete notification indicating termination of the file creation process. Upon receiving the operation code notification, the lazy linking module 108 may ascertain if the operation code notification is the release notification. In case the operation code is the delete notification, the lazy linking module 108 may ascertain that the file creation has been aborted and thus decide not to go ahead with lazy linking. The lazy linking module 108 further request the file-pool creation module 120 to move the inode, being retrieved for the current file creation process, back to the pre-created pool of files 124.

Upon ascertaining that the operation code notification is the release notification, the lazy linking module 108 may initiate the lazy linking process. In one example, the lazy linking module 108 may initiate the file system link operation for linking the pre-created file with the target directory. The lazy linking module 108 may initiate the file system link operation by issuing a predetermined application programming interface (API), say, a VFS_link API. The VFS_link API is defined as a kernel virtual file system API. The lazy linking module 108 may subsequently flush a parent directory corresponding to the target directory in which the new file is to be created. The lazy linking module 108 may flush the parent directory to commit a link between the pre-created file and the target directory. Lazy linking the pre-created file with the target directory facilitates in file creation with low latency. As previously described, the new file is created and made available for access to the user after the creation of the intent log without waiting for actual linking of the pre-created file with the target directory process, thus reducing the time delay associated with file creation.

Further, in order to avoid a stale file issue related with inode reuse and also to ensure that an inode is not used for creation of more than one files, a lazy unlink of inodes is performed by the lazy linking module 108. In one example, the lazy linking module 108 initially analyzes the lazy_link list to identify one or more inodes having a link count of greater than one. In one example, the link count indicates a number of dentries with which an inode is associated. In said example, journal entries corresponding to the lazy linking operations are analyzed to identify the inodes with the link count of greater than one. Upon identifying the inodes that have the link count greater than one, the lazy linking module 108 may remove the inode from the pre-created pool to avoid further linking of the inodes. The lazy linking module 108 may perform the lazy unlink as a daemon service in parallel to the file creation process in order to avoid any stale inode reference.

In one example, the lazy linking module 108 may also perform the lazy unlink during a post-crash recovery of the system 102. In said example, the lazy linking module 108 may move the inodes having the link count of greater than one from the pre-created pool of files to the lazy_link list.

Further, as previously described, when a file stored in the storage device 132 of the system 102 is deleted, the file-pool creation module 120 may add the deleted file to the pre-created pool of files. In one example, while populating the pre-created pool of files, the file-pool creation module 120 may also reuse the inodes associated with the deleted files for future file creation processes. Reusing the deleted files and the associated inodes facilitates in reducing overheads related to creation of pre-created files as generally the process would involve adding the blocks related to the deleted files back to the storage device 132. The blocks would then be accessed and used for creating new pre-created files. Adding the deleted files directly back to the pre-created pool of files, however, facilitates in reducing the overheads related to creation of pre-created files. Further, to facilitate such usage of the deleted files and the associated inodes, the file-pool creation module 120 may generate a new inode generation number for each inode being reused in the pre-created pool of files. In one example, the file-pool creation module 120 may generate the new inode generation number by modifying an existing inode generation number corresponding to the inode being reused in the pre-created pool of files generate a new inode number. Examples of modifying the existing inode generation number include incrementing the existing inode generation number by a value of 1. The new inode generation number may be generated in dentry each time an inode or an inode number gets reused. Generating the new inode generation number facilitates in avoiding stale file handle issues.

Figure 2:
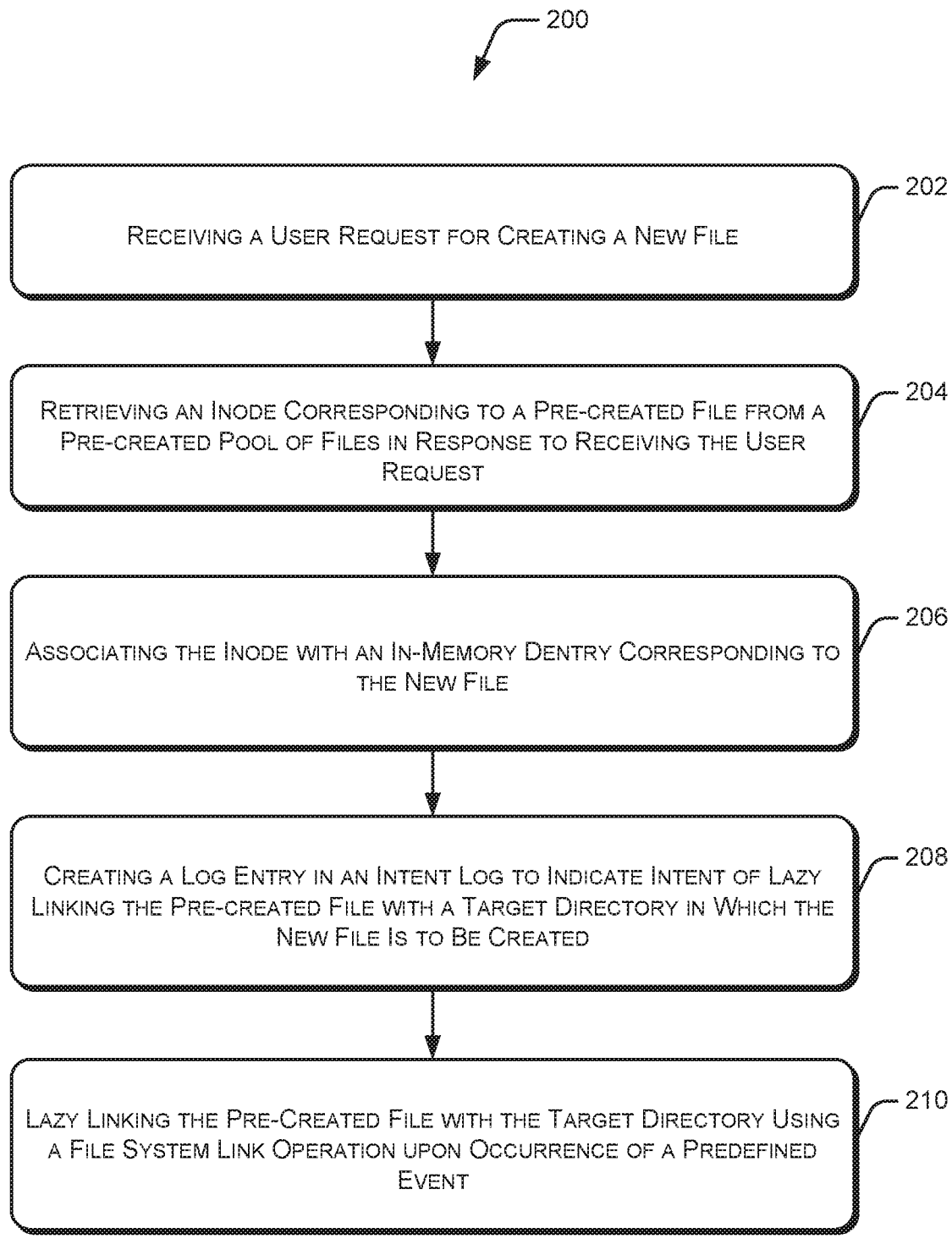
FIG. 2 illustrates an example method for file creation, in accordance with an example of the present subject matter.
Figure 3:
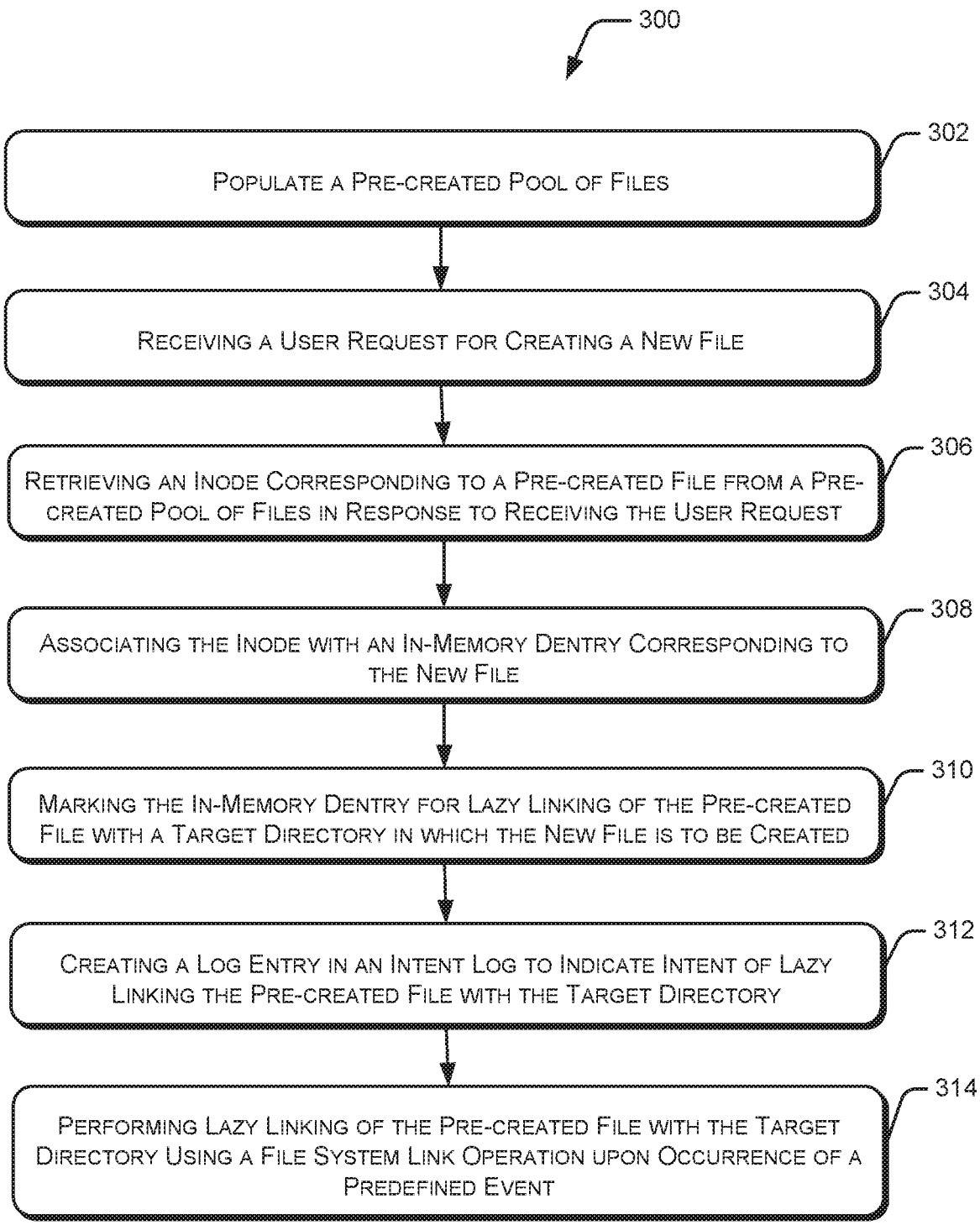
FIG. 3 illustrates another example method for file creation, in accordance with an example of the present subject matter.
Figure 4:
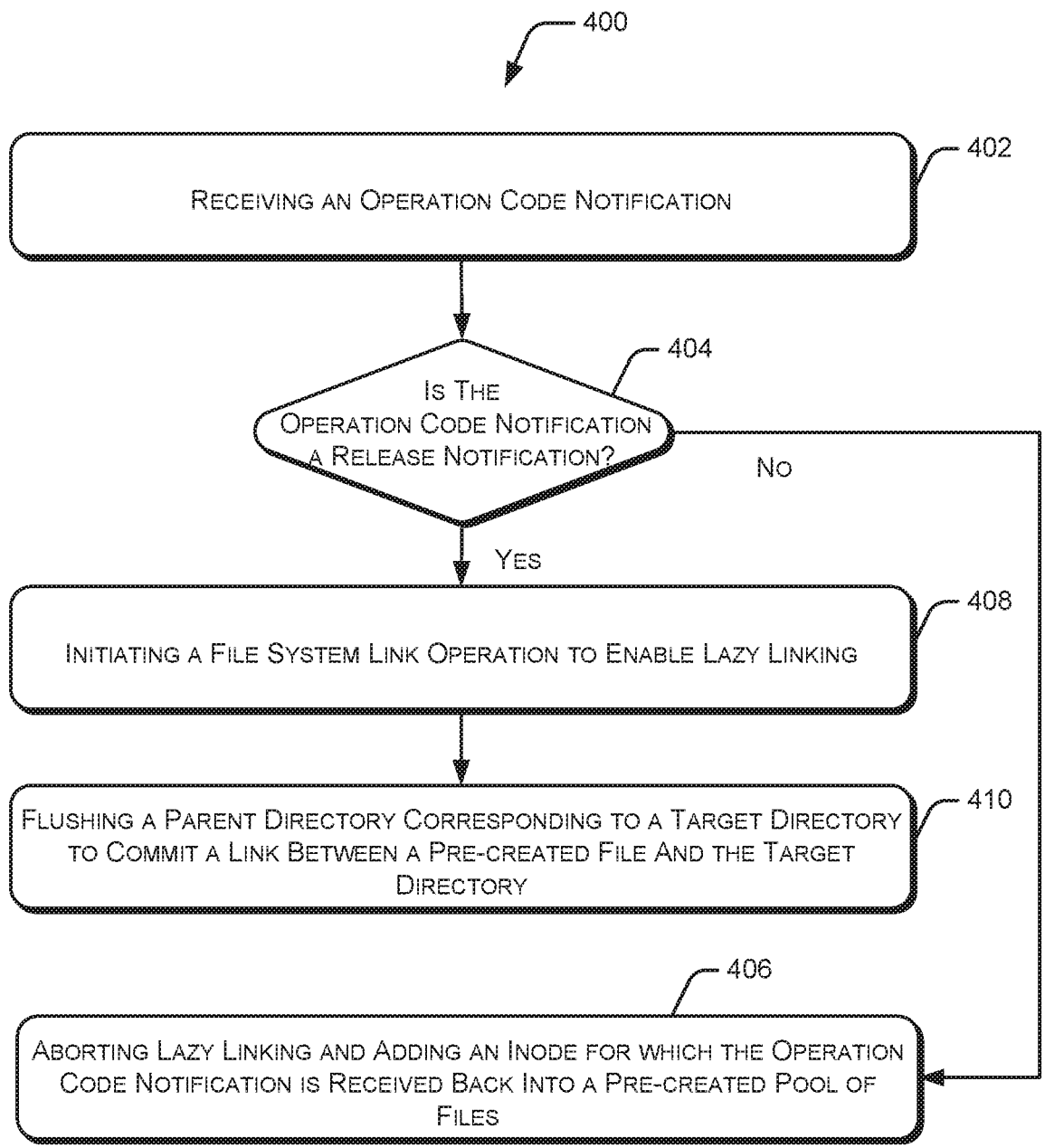
FIG. 4 illustrates a method of lazy linking for file creation, in accordance with an example of the present subject matter.

FIGS. 2, 3, and 4 illustrate example methods 200, 300, and 400 respectively, for file creation, according to an implementation of the present subject matter. The order in which the methods are described is not intended to be construed as a limitation, and any number of the described method blocks may be combined in any order to implement the aforementioned methods, or an alternative method. Furthermore, the methods 200, 300, and 400 may be implemented by processing resource or computing device(s) through any suitable hardware, non-transitory machine readable instructions, or combination thereof.

It may also be understood that the methods 200, 300, and 400 may be performed by programmed computing devices, such as the system 102 as depicted in FIGS. 1(a) and 1(b). Furthermore, the methods 200, 300, and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, the methods 200, 300, and 400 are described below with reference to the system 102 as described above, other suitable systems for the execution of these methods can be utilized. Additionally, implementation of these methods is not limited to such examples.

Referring to FIG. 2, at block 202, a user request for creating a new file is received. In one example, the user request is received from a user device of a user. For instance, a user intending to create a new file for storing data may send the user request to a computing system, for example, the system 102. Upon receiving the user request, an interaction module, such as the interaction module 118 of the system 102 analyzes the user request to determine a purpose of the user request. In case the user request is for creating a new file, the interaction module may provide the user request to a processing module, say, the processing module 106 of the system 102 for creating the new file.

At block 204, an inode corresponding to a pre-created file is retrieved from a pre-created pool of files. The inode is retrieved in response to receiving the user request. The pre-created pool of files includes a plurality of pre-created files and their corresponding inodes. In one example, upon receiving the user request, inode is retrieved by the processing module 106 of the system 102.

At block 206, the inode is associated with an in-memory dentry corresponding to the new file. In one example, the in-memory dentry includes a filename of the new file that has to be created. The inode may be linked to the filename to facilitate file creation.

At block 208, a log entry is created in an intent log. The log entry in the intent log indicates intent of lazy linking the pre-created file with a target directory in which the new file is to be created. In one example, the processing module 106 of the system 102 may create the log entry in the intent log.

At block 210, lazy linking of the pre-created file with the target directory is performed. In one example, the lazy linking is performed using a file system link operation upon occurrence of a predefined event.

Referring to FIG. 3, the FIG. 3 illustrates example method 300, for file creation, according to an implementation of the present subject matter.

At block 302, a pre-created pool of files is populated. The pre-created pool of files includes a plurality of pre-created files and their corresponding inodes. The pre-created pool of files may be created using either new pre-created files, created for being used as pre-created files, or old deleted files that have been deleted from the storage device 132 of the system 102. In one example, the pre-created pool of files is populated by a file-pool creation module, say, the file-pool creation module 120 of the system 102.

At block 304, a user request for creating a new file is received. In one example, the user request is received from a user device of a user. Upon receiving the user request, an interaction module, such as the interaction module 118 of the system 102 may provide the user request to a processing module, say, the processing module 106 of the system 102 for creating the new file.

At block 306, an inode corresponding to a pre-created file is retrieved from a pre-created pool of files in response to receiving the user request. The pre-created pool of files includes a plurality of pre-created files and their corresponding inodes. In one example, upon receiving the user request, inode is retrieved by the processing module 106 of the system 102.

At block 308, the inode is associated with an in-memory dentry corresponding to the new file. In one example, the in-memory dentry may be defined as directory entry created in a transient memory, such as a random access memory (RAM). The in-memory dentry includes a filename of the new file that has to be created. The inode may be linked to the filename to facilitate file creation.

At block 310, the in-memory dentry is marked for lazy linking of the pre-created file with a target directory. The target directory is a directory in which the new file is to be created. In one example, the processing module 106 of the system 102 may mark the in-memory dentry using a pre-defined flag to indicate that the dentry requires a lazy link commit for lazy linking the pre-created file with the target.

At block 312, a log entry is created in an intent log to indicate intent of lazy linking of the pre-created file with the target directory. In one example, the intent log is saved in an NVM of the system 102. In one instance, the processing module 106 of the system 102 may create the log entry in the intent log.

At block 314, lazy linking of the pre-created file with the target directory is performed using a file system link operation. In one example, the lazy linking is performed upon occurrence of a predefined event. The predefined event, in one example, may be termination of a last reference of the dentry, during the process of new file creation. The predefined event, in another example, may be a post-crash recovery process performed subsequent to abrupt shutdown or system-crash of the system 102. The predefined event, in another example, may be a rename operation performed in response to receiving a rename request for renaming a file before the lazy link is committed. The predefined event, in yet another example, may be an overflow of the intent log. The lazy linking may thus be deferred till the time any of the predefined event occurs.

FIG. 4 illustrates the method 400 of lazy linking for file creation, in accordance with an example of the present subject matter. In one example, the method 400 corresponds to the steps 210 and 314 of the methods 200 and 300, respectively.

At block 402, an operation code notification is received. In one example, the operation code notification may be at least one of a release notification and a delete notification. The release notification indicates termination of the last reference of dentry. The delete notification indicates termination of the file creation process. In one example, the operation code notification is received by a lazy linking module, say, the lazy linking module 108 of the system 102.

At block 404, it is determined whether the operation code notification is a release notification or not. For example, in case the operation code notification is not a release notification and is instead a delete notification, ('No' path from block 404), the lazy linking is aborted at block 406. Further, an inode for which the operation code notification is received is added back into a pre-created pool of files.

If in case it is determined that the operation code notification is the release notification, ('Yes' path from block 404), a file system link operation is initiated to enable lazy linking at block 408.

At block 410, a parent directory corresponding to a target directory in which the new file is to be created is flushed. In one example, the lazy linking module 108 may flush the parent directory to commit a link between the pre-created file and the target directory.

Figure 5:
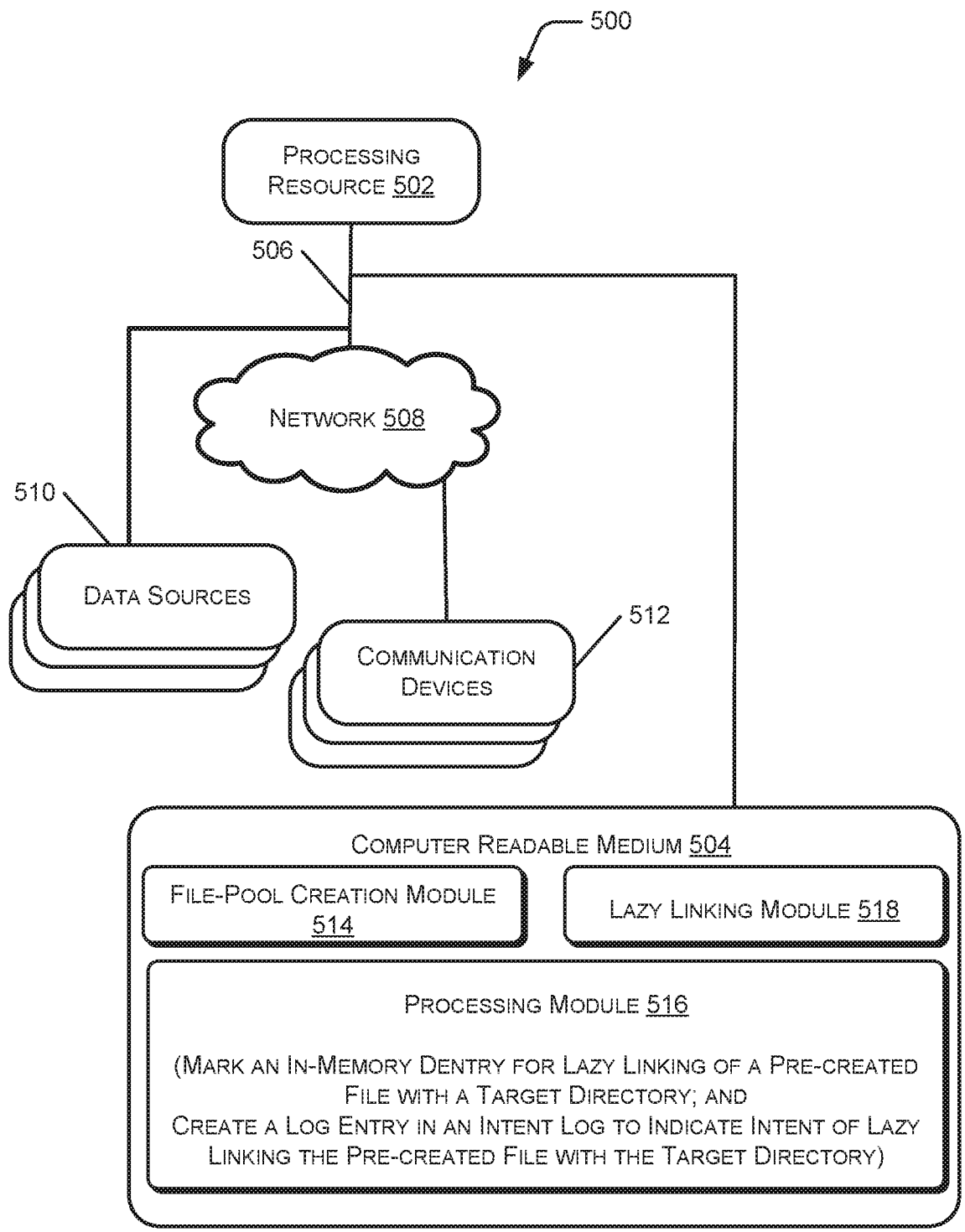
FIG. 5 illustrates an example network environment implementing a non-transitory computer readable medium for file creation, in accordance with an example of the present subject matter.

FIG. 5 illustrates a system environment 500 for file creation, according to an example of the present disclosure. The system environment 500 may comprise at least a portion of a public networking environment or a private networking environment, or a combination thereof. In one implementation, the system environment 500 includes a processing resource 502 communicatively coupled to a computer readable medium 504 through a communication link 506.

For example, the processing resource 502 can include one or more processors of a computing device for file creation. The computer readable medium 504 can be, for example, an internal memory device of the computing device or an external memory device. In one implementation, the communication link 506 may be a direct communication link, such as any memory read/write interface. In another implementation, the communication link 506 may be an indirect communication link, such as a network interface. In such a case, the processing resource 502 can access the computer readable medium 504 through a network 508. The network 508 may be a single network or a combination of multiple networks and may use a variety of different communication protocols.

The processing resource 502 and the computer readable medium 504 may also be coupled to requested data sources 510 through the communication link 506, and/or to communication devices 512 over the network 508. The coupling with the requested data sources 510 enables in receiving the requested data in an offline environment, and the coupling with the communication devices 512 enables in receiving the requested data in an online environment.

In one implementation, the computer readable medium 504 includes a set of computer readable instructions, implementing a file-pool creation module 514, a processing module 516, and a lazy linking module 518. The set of computer readable instructions can be accessed by the processing resource 502 through the communication link 506 and subsequently executed to process requested data communicated with the requested data sources 510 in order to facilitate file creation. When executed by the processing resource 502, the instructions of file-pool creation module 514 may perform the functionalities described above in relation to the file-pool creation module 120. When executed by the processing resource 502, the instructions of the processing module 516 may perform the functionalities described above in relation to the processing module 106. When executed by the processing resource 502, the instructions of the lazy linking module 518 may perform the functionalities described above in relation to the lazy linking module 108.

For example, the file-pool creation module 514 may populate a pre-created pool of files for being user for fast file creation. In one example, the pre-created files are physical blocks linked to corresponding inodes. The pre-created files are, however, not assigned any filenames and are added to a hidden namespace of the pre-created pool of files. Subsequently, upon receiving a user request for creating a new file, the processing module 516 may retrieve an inode corresponding to a pre-created file from the pre-created pool of files. The processing module 516 may subsequently associate the inode with an in-memory dentry corresponding to the new file. As previously described, the in-memory dentry is a directory entry created in a volatile storage, such as the RAM.

The processing module 516 further marks the in-memory dentry for lazy linking of the pre-created file with a target directory in which the new file is to be created. The processing module 516 may then create a log entry in an intent log. The processing module 516 may create the intent log in a non-volatile memory (NVM) of the communication devices 512. The intent log indicates the intent of lazy linking the pre-created file with the target directory. In one example, linking of the pre-created file and the target directory is deferred till the occurrence of the predefined event. The predefined event, in one example, may be termination of a last reference of the dentry, during the process of new file creation. The predefined event, in another example, may be a post-crash recovery process performed subsequent to abrupt shutdown or system-crash of the communication devices 512. The predefined event, in another example, may be a rename operation performed in response to receiving a rename request for renaming a file before the lazy link is committed. The predefined event, in yet another example, may be an overflow of the intent log.

The lazy linking module 518 subsequently initiates a file system link operation for linking the pre-created file with the target directory. In one implementation, the lazy linking module 518 may initiate the lazy linking upon receiving a notification indicating occurrence of the predefined event. In one example, in case the lazy linking module 518 receives a delete notification indicating termination of the file creation process, the lazy linking module 518 may abort lazy linking of the pre-created file with the target directory.

The lazy linking module 518 may further perform lazy unlink of inodes. In one example, the lazy unlink may be performed as a daemon service in parallel to the file creation process in order to avoid any stale inode reference. In one example, the lazy linking module 518 may initially analyze a lazy_link list to identify one or more inodes having a link count of greater than one. The lazy_link list includes a list of plurality of inodes and dentries corresponding to each of the plurality of inodes. The link count indicates a number of dentries with which an inode is associated. The lazy linking module 518 may then remove the inodes having the link count of greater than one from the pre-created pool.

Although examples for the present disclosure have been described in language specific to structural features and/or methods, it should stood that the appended claims are not necessarily limited to the specific features or methods described. Rather, the specific features and methods are disclosed and explained as examples of the present disclosure.

We claim:

1. A method comprising:
   receiving a user request for creating a new file;
   retrieving an inode corresponding to a pre-created file from a pre-created pool of files in response to receiving the user request;
   associating the inode with an in-memory dentry corresponding to the new file;
   creating a log entry in an intent log to indicate intent of lazy linking of the pre-created file with a target directory in which the new file is to be created; and
   lazy linking of the pre-created file with the target directory using a file system link operation upon occurrence of a predefined event.

2. The method as claimed in claim 1 further comprising marking the in-memory dentry for lazy linking of the pre-created file with the target directory.

3. The method as claimed in claim 1, wherein the associating further comprises:
   creating the dentry corresponding to the new file, wherein the dentry includes a filename of the new file; and
   linking the inode with the filename of the new file.

4. The method as claimed in claim 1 further comprising:
   analyzing a lazy_link list to identify one or more inodes having a link count of greater than one, wherein the lazy_link list includes a list of plurality of inodes and dentries corresponding to each of the plurality of inodes, and wherein the link count indicates a number of dentries with which an inode is associated; and
   removing the one or more inodes from the pre-created pool.

5. The method as claimed in claim 1, wherein the lazy linking further comprises:
   receiving an operation code notification;
   ascertain if the operation code notification is a release notification indicating termination of a last reference of dentry;
   initiating the file system link operation; and
   flushing a parent directory corresponding to the target directory to commit a link between the pre-created file and the target directory.

6. The method as claimed in claim 1, wherein the predefined event is at least one of a termination of a last reference of the dentry, a post-crash recovery process, an overflow of the intent log, and a rename operation.

7. A system comprising:
   a processor;
   a processing module coupled to the processor, wherein the processing module is to:
      retrieve an inode corresponding to a pre-created file from a pre-created pool of files in response to a user request received for creating a new file;
      associate the inode with an in-memory dentry corresponding to the new file;
      mark the in-memory dentry for lazy linking of the pre-created file with a target directory in which the new file is to be created; and
      create a log entry in an intent log to indicate intent of lazy linking the pre-created file with the target directory; and
   a lazy linking module coupled to the processor, wherein the lazy linking module is to:
      initiate a file system link operation for linking the pre-created file with the target directory for creating the new file upon occurrence of a predefined event.

8. The system as claimed in claim 7, wherein the lazy linking module further is to:
   analyze a lazy_link list to identify one or more inodes having a link count of greater than one, wherein the lazy_link list includes a list of plurality of inodes and dentries corresponding to each of the plurality of inodes, and wherein the link count indicates a number of dentries with which an inode is associated; and
   remove the one or more inodes from the pre-created pool.

9. The system as claimed in claim 7 further comprising a file-pool creation module coupled to the processor, wherein the file-pool creation module is to:
   receive a pre-created file, wherein the pre-created file is at least one of a deleted file and a new pre-created file; and
   add the pre-created file to a hidden name space of the pre-created pool of files to populate the pre-created pool of files.

10. The system as claimed in claim 9, wherein the file-pool creation module further is to modify, for each inode being reused in the pre-created pool of files, an inode generation number corresponding to the each inode to generate a new inode generation number corresponding to the each inode, wherein the each inode being reused corresponds to files being deleted from a storage device.

11. The system as claimed in claim 7, wherein the processing module further is to move the inode from the pre-created pool of files to a lazy_link list for creating the new file.

12. A non-transitory computer readable medium having a set of computer readable instructions that, when executed, cause a processor to:
   populate a pre-created pool of files;
   retrieve an inode corresponding to a pre-created file from the pre-created pool of files upon receiving a user request for creating a new file;
   associate the inode with an in-memory dentry corresponding to the new file;
   mark the in-memory dentry for lazy linking of the pre-created file with a target directory in which the new file is to be created; and
   create a log entry in an intent log to indicate intent of lazy linking the pre-created file with the target directory for creating the new file.

13. The non-transitory computer readable medium of claim 12, wherein the computer readable instructions, when executed, further cause the processor to lazy link the pre-created file with the target directory using a file system link operation upon occurrence of a predefined event.

14. The non-transitory computer readable medium of claim 12, wherein the computer readable instructions, when executed, further cause the processor to abort lazy linking of the pre-created file with the target directory upon receiving a delete notification indicating termination of file creation process.

15. The non-transitory computer readable medium of claim 13, wherein the computer readable instructions, when executed, further cause the processor to:
   analyze a lazy_link list to identify one or more inodes having a link count of greater than one, wherein the lazy_link list includes a list of plurality of inodes and dentries corresponding to each of the plurality of inodes, and wherein the link count indicates a number of dentries with which an inode is associated; and
   remove the one or more inodes from the pre-created pool.

* * * * *